United States Patent
Gioia (10) Patent No.: US 7,362,903 B2
(45) Date of Patent: Apr. 22, 2008

(54) WAVELET-BASED MESH CODING METHOD

(75) Inventor: Patrick Gioia, Cesson Sevigne (FR)

(73) Assignee: France Telecom, Paris (FR)

( * ) Notice: Subject to any disclaimer, the term of this patent is extended or adjusted under 35 U.S.C. 154(b) by 783 days.

(21) Appl. No.: 10/432,343

(22) PCT Filed: Nov. 21, 2001

(86) PCT No.: PCT/FR01/03675

§ 371 (c)(1),
(2), (4) Date: Nov. 6, 2003

(87) PCT Pub. No.: WO02/43005

PCT Pub. Date: May 30, 2002

(65) Prior Publication Data

US 2004/0076331 A1 Apr. 22, 2004

(30) Foreign Application Priority Data

Nov. 21, 2000 (FR) .................................. 00 15043

(51) Int. Cl.
*G06K 9/36* (2006.01)
*G06K 9/70* (2006.01)
*H03M 7/00* (2006.01)
*G06T 9/00* (2006.01)
*H04N 7/12* (2006.01)
*H04B 1/66* (2006.01)

(52) U.S. Cl. ...................... 382/232; 382/240; 382/233; 382/226; 341/79; 345/555; 348/384.1; 348/440.1; 375/240.01

(58) Field of Classification Search ................ 382/232, 382/233, 240, 226; 341/79; 345/555; 348/384.1, 348/440.1; 375/240.01
See application file for complete search history.

(56) References Cited

U.S. PATENT DOCUMENTS 5,107,444 A 4/1992 Wu ............................ 340/750

(Continued)

FOREIGN PATENT DOCUMENTS

EP 784 295 7/1997

(Continued)

OTHER PUBLICATIONS

Certain, A.—"Interactive Multiresolution Surface Viewing"—ACM—1996, pp. 91-98.*

(Continued)

*Primary Examiner*—Jingge Wu
*Assistant Examiner*—Bernard Krasnic
(74) *Attorney, Agent, or Firm*—Westman, Champlin & Kelly (57) ABSTRACT

A method is provided for coding a source mesh (M) representing a three-dimensional object or a scene, using a simple mesh ($M_0$) having a limited number of facets, each defined by vertices and edges, and coefficients in a base of wavelets, corresponding to local modifications of the simple mesh ($M_0$), and making it possible, at each instant, to determine a function of parameterization of the mesh. The method includes a step to eliminate the effect of at least one wavelet coefficient (d; d1, . . . , dn) verifying at least one criterion of non-essentiality, so as to give a partial mesh (M'), corresponding to a partial representation of the source mesh (M).

12 Claims, 5 Drawing Sheets

U.S. PATENT DOCUMENTS

| | | | | |
|---|---|---|---|---|
| 5,929,860 | A | * | 7/1999 | Hoppe ......................... 345/419 |
| 6,144,773 | A | | 11/2000 | Kolarov et al. ............. 382/240 |
| 6,262,737 | B1 | * | 7/2001 | Li et al. ..................... 345/419 |
| 6,314,205 | B1 | * | 11/2001 | Masuda et al. ............. 382/232 |
| 6,677,949 | B1 | * | 1/2004 | Gioia .......................... 345/428 |
| 6,931,155 | B1 | * | 8/2005 | Gioia .......................... 382/232 |

FOREIGN PATENT DOCUMENTS

| | | | |
|---|---|---|---|
| EP | 789330 A2 | * | 8/1997 |
| FR | 2 781 908 | | 2/2000 |
| WO | WO 9732281 A1 | * | 9/1997 |
| WO | WO 8604 A1 | * | 2/2000 |

OTHER PUBLICATIONS

Gross, M.—"Fast multiresolution surface meshing"—IEEE—1995, pp. 135-142.*

Zorin, D.—"Interactive Multiresolution Mesh Editing"—ACM—Aug. 1997.*

Schroeder, W.—"Decimation of Triangle Meshes"—ACM—Jul. 1992, vol. 26, issue 2, pp. 65-70.*

"Geometric Optimization", Proceedings of the Conference on Visualization, 1993, pp. 189-195.

"Efficient Triangular Surface Approximations Using Wavelets and Quadtree Data Structures", IEEE Transactions on Visualization and Computer Graphics, vol. 2, No. 2, Jun. 1996, pp. 130-143.

"Multiresolution Analysis of Arbitrary Meshes", Computer Graphics Proceedings Aug. 1995, pp. 173-182.

"Progressive Meshes", Computer Graphics Proceedings 1996, pp. 99-108.

* cited by examiner

WAVELET-BASED MESH CODING METHOD

CROSS-REFERENCE TO RELATED APPLICATION

This Application is a Section 371 National Stage Application of International Application No. PCT/FR01/03675, filed Nov. 21, 2001 and published as WO 02/43005 on May 30, 2002 not in English.

FIELD OF THE INVENTION

The field of the invention is that of the coding of images or image elements (or picture elements). More specifically, the invention relates to the representation and adaptive coding of three-dimensional (3D) scenes (or objects of scenes) represented by meshes.

BACKGROUND OF THE INVENTION

The invention can be applied in all fields where it is desirable to reduce the number of pieces of information necessary for the efficient representation of the digital image, in order to store it and/or transmit it. For example, the invention can be used for the transmission of images through the Internet. In this context, it enables the animation of 3D scenes with a real-time display, although the bit rate is neither constant nor guaranteed. In this case, the invention may be a primitive of a data transmission language such as VRML (or "Virtual Reality Modeling Language").

Other applications that may be envisaged include the storage of animated data on CD-ROM (or any equivalent data carrier), multiple-user applications, digital television etc.

The invention proposes an improvement in methods known as "wavelet-based" methods through which a mesh can be represented as a succession of details added to a base mesh. The general theory of this technique is described especially in M. Lounsbery, T. DeRose and J. Warren, "Multiresolution Analysis for Surfaces of Arbitrary Topological Type" (ACM Transactions on Graphics, Vol. 16, No. 1, pp. 34-73).

According to this technique, a mesh is represented by a sequence of coefficients corresponding to the coordinates, in a wavelet base, of a parametrization of said mesh by a simple polyhedron.

A surface S in space can be represented as the image of an injective continuous function defined on a polyhedron $M_o$ of the same topological type and having values in $R^3$. It is then said that the surface is parametrized by the polyhedron, and the said function is called "parametrization". This function is a triplet of functions with values in R, each of which can be developed in a base of the space $C^o(M_o)$ of the continuous functions on the polyhedron with values in R.

In the case of the mesh surfaces, this technique is used to obtain a compressed representation of the mesh. Furthermore, the use of wavelets as basic functions enables a progressive representation from the most approximate shape to the most detailed shape.

These functions are not wavelets in the classic sense, but comply with refining relationships that generalize the concept of multiresolution analysis: let $M_o$ be a polyhedron on which a parametrization with a surface M is defined. We consider the sub-space $S_o$ of $C^o(M_o)$ generated by the functions $\phi_i^o$ defined as follows: $\phi_i$ is affine on each facet; it is equal to 1 on the ith vertex and 0 on all the others.

A definition is made, in the same way, of the sub-spaces $S_j$ generated by the functions $\phi_i^j$ defined in the same way but in replacing $M_o$ by the mesh $M_j$ obtained in canonically subdividing each facet of $M_{j-1}$. The spaces $S_j$ are finite in dimension and nested, $S_o$ being the smallest, and any continuous function of $M_o$ in R can be approached uniformly by a function of a value of $S_j$ for j as a fairly great value.

It is this inclusion that enables the progressive coding: if $W_j$ denotes a supplementary of $S_j$ in $S_{j+1}$ and $\{\psi_i^j\}_i$ (the wavelets) a base of $W_j$ the set $$\{\phi_i^o\}_i \cup \bigcup_{j \geq o} \{\psi_i^j\}_i$$

forms a base of $C^o(M_o)$. The function p parametrizing M is therefore written uniquely as where the values $C_i$ and the values $d_i^j$ are in $R^3$, and are called wavelet coefficients.

In practice, the wavelets are chosen in such a way that their support enables a determining of the wavelet coefficients in O(n), where n is the number of vertices of the mesh M: for k as a fixed integer, if $D_{k,i}$ denotes the set of the indices of the vertices of a mesh $M_j$ which are at a distance of less than k edges from the vertex i, the wavelet $\psi_i^j$ is given by $$\psi_i^j = \phi_i^{j+1} + \sum_{l \in D_{k,i}} \alpha_l \phi_l^j,$$

in such a way that $\psi_i^j$ is with a support in $D_{k+1,i}$.

Thus, during the reconstruction, the influence of a wavelet coefficient is limited to a neighborhood of this kind.

In practice, during the reconstruction, the base mesh $M_0$ is represented in arborescent form: each of its faces is the root of a tree where the children of each node are the four faces obtained after canonical subdivision. The wavelet coefficients are indexed by their barycentric coordinates on one face of $M_0$.

The method of display comprising data structures and algorithms enabling the progressive reconstruction of meshes represented by wavelets has been proposed by A. Certain, J. Popovic, T. DeRose, D. Salesin and W. Stuetzle in "Interactive Multiresolution Surface Viewing", (Computer Graphics Proceedings 1996).

This method is generally considered to be the method of reference in the field of the display of surfaces represented by wavelets.

This technique consists in taking account of packets of wavelet coefficients and in regularly refining the mesh as a function of these coefficients.

Although it is efficient for the progressive reconstruction of meshes, this method has the drawback of not enabling an adaptive display of three-dimensional scenes or objects.

Indeed, one drawback of this prior art technique is that it induces the creation, by subdivision, of unnecessary facets. This gives rise to an unnecessary increase in the number of pieces of data needed for the description of the mesh.

A technique of this kind is therefore far too cumbersome in terms of data to be transmitted to enable an adaptive display of 3D scenes or objects, especially when the objects are animated, when the power of the display terminal is low and/or when the transmission bit rate is variable and/or limited.

It is a goal of the invention especially to overcome these drawbacks of the prior art.

More specifically, it is a goal of the invention to implement a technique for the coding of meshes representing 3D objects and scenes, enabling an adaptive reconstruction of a mesh within a display terminal.

In particular, it is a goal of the invention to provide a coding method of this kind enabling an adaptive display of a 3D object or scene as a function of parameters, such as, for example, an observer's viewpoint.

It is another goal of the invention to provide a coding method of this kind enabling the user to navigate within a 3D scene refreshed at a substantially constant rate, independently of the parameters of the navigation or size of the associated mesh.

It is also a goal of the invention, naturally, to provide a technique for the reconstruction and transmission through a communications network of a coding object according to this coding method.

SUMMARY OF THE INVENTION

These goals as well as others that shall appear hereinafter, are achieved by means of a method for coding a source mesh (M) representing a three-dimensional object or a scene, using a simple mesh ($M_0$) having a limited number of facets, each defined by vertices and edges, and coefficients in a base of wavelets, corresponding to local modifications of said simple mesh ($M_0$), and making it possible, at each instant, to determine a function of parametrization of the mesh.

According to the invention, a method such as this comprises a step to eliminate the effect of at least one wavelet coefficient (d; d1, ..., dn) verifying at least one criterion of non-essentiality, so as to give a partial mesh (M'), corresponding to a partial representation of said source mesh (M).

Thus, the invention relies on a wholly novel and inventive approach to the coding of wavelet-based meshes representing 3D objects or scenes. Indeed, the invention relies especially on the elimination of the wavelet coefficients associated with details of a 3D scene or object that are not essential to the viewing of such a scene or such an object by an observer.

A coding method of this kind makes it possible especially to eliminate wavelet coefficients, as well as their influence on the representation of the 3D scene considered, in a period of time substantially equal to the time necessary to add them. In this way, a coding technique of this kind makes it possible, at any time, to add coefficients that have become essential and eliminate coefficients whose influence may be considered to be negligible, and to do so homogeneously, i.e. without the refresh rate of a representation of the 3D scene being dependent on the parameters of navigation within this scene or on the size of the reconstructed mesh.

According to a first advantageous characteristic of the invention, a wavelet coefficient verifies a criterion of non-essentiality if it is associated with a facet of said simple mesh ($M_0$) not belonging to the visible part of said source mesh (M).

The invention thus enables the elimination of the wavelet coefficients which are not visually relevant for the representation of the 3D scene or object considered.

According to a second advantageous characteristic of the invention, a wavelet coefficient verifies a criterion of non-essentiality if the amplitude of said coefficient is below a threshold, determined as a function of the distance between an observer and a vertex indexing said coefficient.

The invention also enables the elimination of the effect of wavelet coefficients whose amplitude may be considered to be negligible for the display of the 3D scene or object considered.

Preferably, a coding method of this kind comprises a step for the computation of said threshold, taking account of said distance and of an indicator of capacity of a terminal for the display of said three-dimensional object or scene.

The invention therefore enables an elimination of the effect of certain wavelet coefficients, adapted to the capacity of the terminal to display the 3D scene or object considered. Thus, when the display terminal has high processing capacity, the threshold is low, so as to preserve a greater number of wavelet coefficients during the coding of the mesh. Conversely, in the presence of a low-capacity display terminal, the threshold computation step leads to a high result, so that the effect of a larger number of wavelet coefficients is eliminated during the elimination step.

According to a first alternative embodiment, said capacity indicator is a constant depending on the processing capacity of said terminal.

The value of such a constant is fixed, for example, as a function of the type of processor with which the display terminal is equipped.

According to a second alternative embodiment, said capacity indicator varies during the display of said three-dimensional object or scene, as a function of the current processing capacity of said terminal.

The value of such a capacity indicator may thus be adapted as a function of the number of images per second that it should be possible to display on the terminal, and varies, for example, as a function of the resources used by other applications processed by the terminal at a given point in time.

Advantageously, a coding method of this kind comprises a step for the flattening of the mesh by the addition, to said parametrization function, of the opposite of said wavelet coefficient or coefficients (d; d1, ..., dn) to be eliminated.

Thus, the influence of a non-essential coefficient is cancelled by the addition of the opposite of this coefficient.

According to an advantageous characteristic of the invention, said partial mesh (M') corresponds to a set of trees, each of said trees representing a face of said simple mesh ($M_0$) and comprising a set of nodes each representing a face of a refined mesh ($M_j$) of the face considered of said simple mesh ($M_0$).

Preferably, a coding method of this kind comprises a step for the withdrawal of at least one wavelet coefficient (d; d1, ..., dn) to be eliminated, comprising the following steps:

the taking into account of the opposite of said wavelet coefficient or coefficients (d; d1, ..., dn);

the taking into account of the modifications induced by the previous step;

the elimination of the parts of the trees defining (M') and influenced solely by said wavelet coefficient or coefficients (d; d1, ..., dn).

Thus, such a step consists in adding the opposite of the wavelet coefficient that has become unnecessary, taking account of the geometrical modifications induced on the mesh by such an elimination of the wavelet coefficient, and pruning the tree representing the mesh in hierarchical form.

Advantageously, a coding method of this kind implements a set of pointers respectively pointing to all the vertices of said partial mesh, so as to directly reach a vertex indexing a wavelet coefficient to be eliminated.

Preferably, said pointers are assembled in a table of integers (VPC).

Thus, the addition of the opposite of a wavelet coefficient to be eliminated is not done like the addition of a regular wavelet coefficient, but by introducing an additional structure (VPC), which is a table whose $i^{th}$ element is the index of the vertex indexed by the $i^{th}$ coefficient, if such a vertex exists.

According to an advantageous technique of the invention, said step of taking the modifications into account implements a recursive pruning algorithm.

The invention also relates to a signal structure representing a source mesh (M) representing a three-dimensional object or scene, coded according to the method described here above, comprising:
- a basic field comprising data representing a simple mesh ($M_0$) having a limited number of facets each defined by vertices and edges;
- at least one refining field comprising coefficients in a base of wavelets, corresponding to local modifications of said simple mesh ($M_0$), and making it possible, at each instant, to determine a function of parametrization of the mesh, a wavelet coefficient (d; d1, . . . , dn) verifying at least one criterion of non-essentiality not taken into account in said signal.

The invention also relates to a device for the coding of a source mesh (M) representing a three-dimensional object or scene, comprising means for determining a simple mesh ($M_0$) having a limited number of facets, each defined by vertices and edges, and coefficients in a base of wavelets, corresponding to local modifications of said simple mesh ($M_0$), and making it possible, at each instant, to determine a function of parametrization of the mesh, comprising means to eliminate the effect of at least one wavelet coefficient (d; d1, . . . , dn) verifying at least one criterion of non-essentiality, so as to give a partial mesh (M'), corresponding to a partial representation of said source mesh (M).

According to a first advantageous characteristic of a coding device such as this, a wavelet coefficient verifies a criterion of non-essentiality if it is associated with a facet of said simple mesh ($M_0$) not belonging to the visible part of said source mesh (M).

According to a second advantageous characteristic of a coding device such as this, a wavelet coefficient verifies a criterion of non-essentiality if the amplitude of said coefficient is below a threshold, determined as a function of the distance between an observer and a vertex indexing said coefficient.

Preferably, a coding device of this kind comprises means for the computation of said threshold, implementing the product of multiplication of said distance by an indicator of the capacity of a terminal for the display of said three-dimensional object or scene.

Advantageously, said coding device co-operates with means for the sorting of said wavelet coefficients as a function, firstly, of a facet of said simple mesh with which each wavelet coefficient is associated and, secondly, the amplitude of said wavelet coefficients.

Thus, the coding device may access the result of an efficient sorting of the wavelet coefficients, through an organisation of the data in rising order of identification of the facets of the source mesh and, for each of these facets, by a sorting in amplitude of the wavelet coefficients indexed by vertices of this facet. Such sorting means may be internal or external to the coding device.

When the coding device has determined that the face of a source mesh belongs to an observer's pyramid of vision, it is enough for it to scan the list of wavelet coefficients of the corresponding face, resulting from the sorting operation described earlier, and stop its search when the coefficient encountered in the list has an amplitude below a determined threshold.

According to a first advantageous variant of the invention, a coding device of this kind co-operates with means for the transmission of data to at least one remote terminal.

According to a second advantageous variant of the invention, such a coding device is integrated into a terminal enabling the display of said object or said scene.

The invention also relates to a device for the decoding of a source mesh (M) representing a three-dimensional object or a scene and comprising means for the reception of a signal having a structure as described here above, and means for the reconstruction of a representation of said object or said scene from said received signal.

Advantageously, such a decoding device comprises means for the transmission of at least one piece of positional information to a server and/or a remote coding device.

Preferably, said piece or pieces of positional information belong to the group comprising:
- a position of an observer of said three-dimensional object or scene;
- a direction of view of an observer of said three-dimensional object or scene.

Indeed, these parameters enable the coding device and/or a server to carry out the identification, within a mesh, of the facets belonging to the observer's pyramid of vision, or to a wider pyramid, called an anticipation pyramid, and hence to determine the visually relevant wavelet coefficients.

The invention also relates to a system for the coding/decoding of a mesh representing a three-dimensional object or scene, comprising at least one coding device and at least one decoding device as described here above.

Such a coding/decoding system may, for example, implement the broadcasting of 3D scenes by a server, through a communications network, and enable a progressive, interactive and adaptive navigation within the 3D scene by the user of a display terminal.

According to a first advantageous technique, such a coding/decoding system comprises first means for the transmission of at least one piece of information on the wavelet coefficients stored in a cache memory of said decoding device, to said coding device.

A piece of information of this kind, coupled with the sorting of the wavelet coefficients, by rising order of facets of the mesh on the one hand, and by amplitude on the other hand thus enables the coding device to know the wavelet coefficients present in the cache memory of the decoding device or of the display terminal. Only the wavelet coefficients necessary for the representation of the 3D scene and not stored in the cache memory are thus transmitted by the coding device, thus preventing any redundant transmission of information.

According to a second advantageous technique, a coding/decoding system of this kind comprises second means for the transmission, to said coding device, of at least one piece of information on the processing capacity of said decoding device, so as to determine an indicator of capacity of said decoding device.

Thus, as a function of the capacity of the decoding device or of the display terminal, the coding device can determine which are the wavelet coefficients to be eliminated.

The invention also relates to the application of the coding method described here above to at least one of the spheres in the group comprising:
- the display of three-dimensional meshed objects on a screen;
- the progressive display of three-dimensional meshed objects on a screen, said wavelet coefficients being taken into account as and when they arrive;
- the display of three-dimensional meshed objects on a screen with at least two levels of detail corresponding to one of the successive meshes ($M_j$);
- the display of three-dimensional meshed objects on a screen with at least two levels of detail corresponding to a partial reconstruction of said source mesh (M) with a limited number of wavelet coefficients;
- the progressive transmission by a communications network of three-dimensional meshed objects;
- the adaptive transmission, by a communications network, of three-dimensional meshed objects;
- the adaptive updating of three-dimensional meshed objects through a communications network from a remote server.

BRIEF DESCRIPTION OF THE DRAWINGS

Other features and advantages of the invention shall appear more clearly from the following description of a preferred embodiment, given by way of a simple illustrative and non-exhaustive example, and from the appended drawings, of which.

DETAILED DESCRIPTION OF THE PREFERRED EMBODIMENTS

The general principle of the invention is based on the elimination of wavelet coefficients associated with parts of a 3D scene or object that are not visually relevant, so as to enable an adaptive display of said object or said scene.

Figure 1:
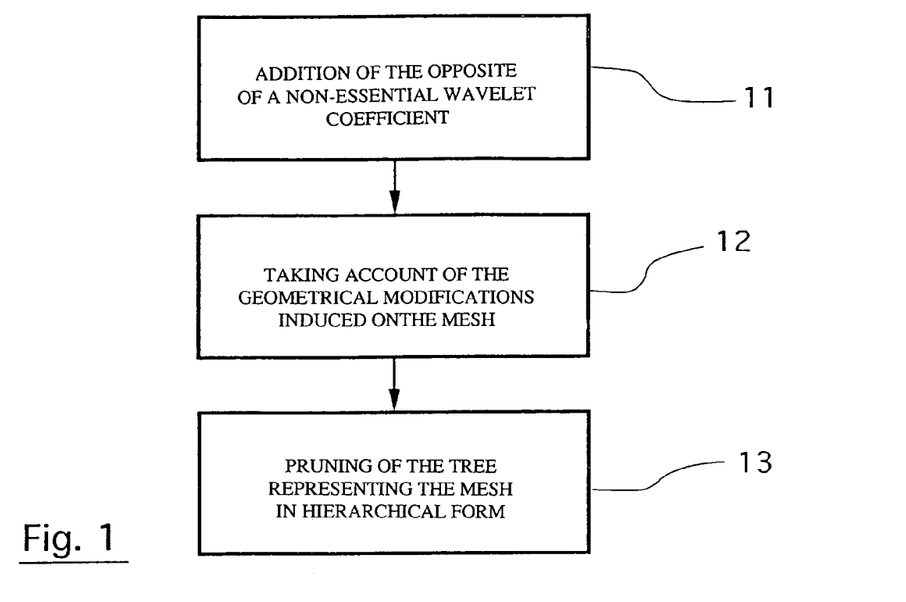
FIG. 1 is a block diagram of the different steps implemented according to the invention during the elimination of non-essential wavelet coefficient.

Referring to FIG. 1, we present an embodiment of an elimination of this kind of a wavelet coefficient associated with a non-visible part of the mesh representing the 3D object or scene.

It will be recalled first of all that the invention implements several structures of data and algorithms enabling the elimination of wavelet coefficients that are not visually relevant, without its being necessary to rebuild the entire associated mesh.

These data structures, which come into play in the progressive depiction of the mesh to be displayed, are the following:
- a first data structure associated with a face of the mesh;
- a second data structure associated with a vertex of the mesh;
- a third data structure associated with the mesh itself.

A face of the mesh is characterised by four fields:
- a level, which is an integer corresponding to the level of subdivision of the face;
- a four-element child table, each element of which is appointed to a face;
- a three-element cornerVertex table, the elements of which are pointers to the vertices of the face;
- a three-element vertex edge table, whose elements are pointers to the middle vertices of the edges of the face, if they exist.

A vertex is characterised by five fields:
- a two-element parentV table, each element of which is a pointer to a vertex, in such a way that the vertex is located geometrically between these two elements;
- a two-element parentF table, each element of which is a pointer to a face, in such a way that the vertex is located in the middle of an edge shared by these two elements;
- a triplet of floating-point real numbers fGeom;
- a tripletsof real numbers g;
- a table hGeom comprising elements of equal number to the subdivision levels, each element being a hat function coefficient (it may be recalled that a hat function is a scale function, refined by pieces, equal to 1 for a vertex of a mesh M and equal to 0 for all the other vertices of this mesh. For further information on hat functions, reference can be made to A. Certain, J. Popovic, T. DeRose, D. Salesin and W. Stuetzle in "Interactive Multiresolution Surface Viewing" (Computer Graphics Proceedings 1996).

A mesh is described in two ways at the display terminal or a decoding device:
- in sequential form, as a list of facets. This list shall be designated hereinafter in this document by the term "display list";
- in hierarchical form, as a 4-tree forest, each of the roots being in a one-to-one correspondence with a face of the source mesh $M_0$ and the children of each node corresponding to a degree of subdivision of the source mesh. This forest shall hereinafter be designated as Q. This forest has a field vertexTable which is a table of vertices.

Here below, we shall recall the principle of the progressive display of a representation of a three-dimensional object or scene. Let M be a mesh to be transmitted in the form of wavelet coefficients to a display terminal. Let it be assumed that, at an instant t, a set $E_t$ of coefficients is transmitted. The following parametrization will be called a temporary parametrization at the instant t:

$$\sum_{c_k^j \in E_t} c_k^j \phi_k^j,$$

and the following mesh will be called the temporary mesh at the instant t $$\phi(M_j),$$

according to the definition given by Certain et al. in "Interactive Multiresolution Surface Viewing", Computer Graphics Proceedings, Annual Conference Series, 1996.

According to the invention, the adaptive display of a 3D object or scene consists in partitioning the set $E_t$ at an instant t into two subsets $P_t$ and $I_t$, $P_t$ representing the set of relevant wavelet coefficients and $I_t$ representing the set of the useful wavelet coefficients, with $$P_t \cap I_t = \emptyset$$

and $$P_t \cup I_t = E_t.$$

This partitioning depends on the viewing parameters, namely an observer's position and his viewing direction: at two instants $t_0$ and $t_1$, it is possible to have $E_{t0}=E_{t1}$ but $P_{t0}$ different from $P_{t1}$.

Hereinafter in the document, the term "updating of the coefficients" will designate the set of processes making it possible to pass from a state E formed by a set $E_t$, a partition $P_t$ and $I_t$, and a corresponding temporary mesh, $$\sum_{c_k^j \in P_t} c_k^j \phi_k^j,$$

to a current state $E_c$ formed by a set $E_{t0}$, a partition $P_{t0}$ and $I_{t0}$, and a corresponding temporary mesh, $$\sum_{c_k^j \in P_{t0}} c_k^j \phi_k^j.$$

Hereinafter in the document, the term "taking account of coefficients" or "adding of coefficients" will designate the set of processes enabling passage from one temporary mesh defined by E to another temporary mesh defined by $E_t$, such that $P_t$ and $P_{t0}$ differ from each other by only one coefficient, called an "added coefficient". The term "elimination of coefficients" will designate all the processes enabling passage from a first temporary mesh to a second temporary mesh, such that $P_t$ and $P_{t0}$ differ by only one coefficient, called an "eliminated coefficient".

The prior art techniques enable a progressive display of the mesh M. According to a novel and inventive approach, the invention makes it possible, by using the same data structures, to obtain an adaptive display of the same mesh M, by using algorithms for the elimination of wavelet coefficients in a short period of time, substantially of the same magnitude as the time needed for the addition of a wavelet coefficient according to the prior art techniques.

According to a classic technique, the addition of a wavelet coefficient consists in subdividing the temporary mesh $M_t$ until the hat function corresponding to the added coefficient is refined on each face of the mesh $M_t$, and then in placing the coefficient in the field hGeom of the vertex indexed by said coefficient. This process is iterated for each coefficient and, when these coefficients are visually taken into account, the elements of hGeom of each vertex of the temporary mesh are added up and added to the various contributions of the successive parents of these vertices, so as to obtain the new position of said vertex in the field g.

The invention enables the withdrawal of wavelet coefficients by relying on the data structure as described here above, according to the steps illustrated in FIG. 1:

during a step referenced 11, the opposite of the wavelet coefficient to be eliminated is added to the parametrization function of the mesh. Such a step can be implemented according to the following algorithm:

```
procedure addOpposite (coeff: integer)
    for i from 1 to 3
        vertexTable[VPC[coeff]][i]-=coeffTable[coeff][i]
    end;
``` during a step referenced 12, the geometrical modifications resulting from the step referenced 11 are taken into account in cascade. At the end of this step, each vertex of the temporary mesh has, in its field fGeom, the value of:

$$\sum_{c_k^j \in P_t} c_k^j \phi_k^j;$$

during a step referenced 13, the two algorithms below are implemented, so as to carry out the pruning of the tree representing the mesh in hierarchical form:

```
procedure prune(Q : forest)
    for each root r of Q
        flattened(r)
    end
and
procedure flattened (r. tree)
    if r is not a leaf do
        for each child s of r
            flattened (s)
        end if
        if isFlat (f) do
            for each child g of f do
                remove g from the display list
                release g
            end for
            add f to the display list
    end.
```

Figure 3:
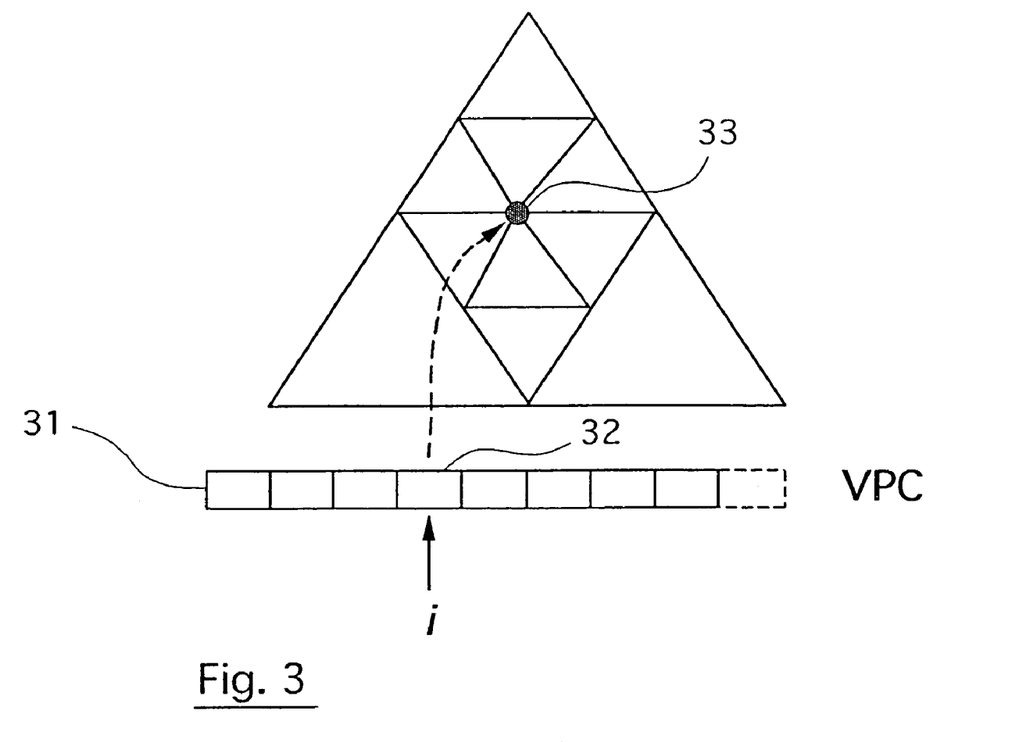
FIG. 3 shows the table of VPC integers listing the vertices indexing the wavelet coefficients.

During the step referenced 11, the addition of the opposite of the wavelet coefficient is done by introducing an additional structure VPC, illustrated in FIG. 3. Such a structure is a table 31 whose $i^{th}$ element 32 is the index of the vertex 33 indexed by the $i_{th}$ coefficient 32, if such a vertex 33 exists. The access to the field hGeom of this vertex 33 is therefore immediate.

Figure 2:
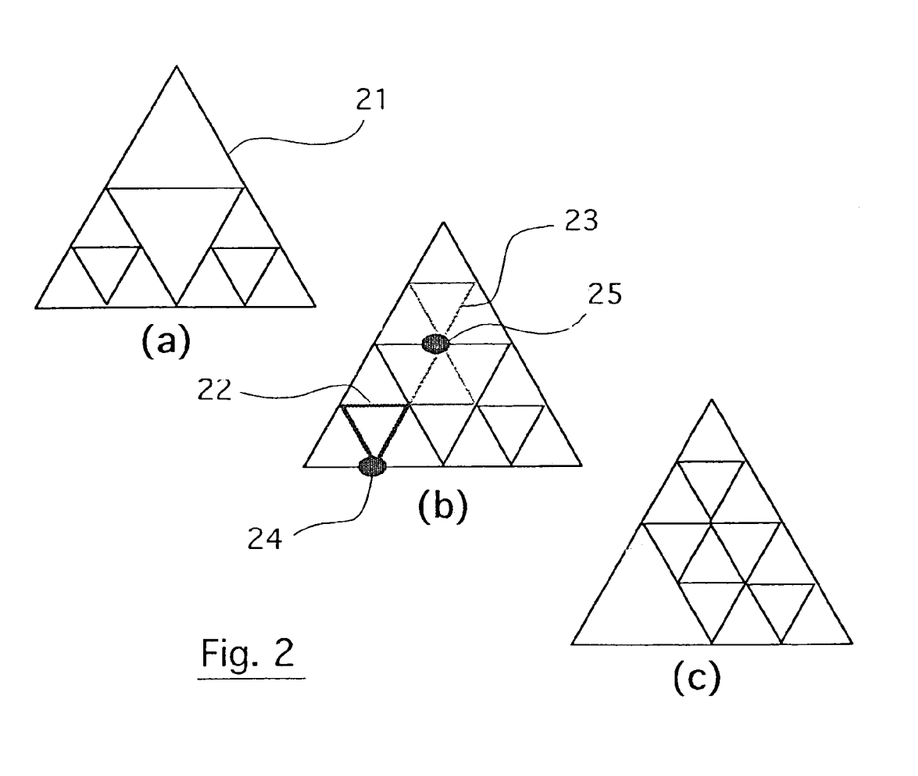
FIG. 2 illustrates the development of the subdivisions of the mesh necessary for the representation of a 3D scene, and the resulting necessity for the elimination of certain wavelet coefficients, as illustrated in FIG. 1.

The elimination of one or more wavelet coefficients during the step referenced 11 is made necessary by the development of the subdivisions of the mesh, as illustrated in FIG. 2.

Indeed, at a given instant t, a face 21 of the base mesh presents the subdivisions of FIG. 2a. The temporal development of the 3D scene with which the mesh considered is associated leads to the development of the mesh, as illustrated in FIG. 2b.

The bold lines 22 represent the subdivisions of the mesh that have become unnecessary, and the lines of dashes 23 represent the subdivisions that have become necessary. It is therefore necessary to eliminate the vertex 24, and therefore the associated wavelet coefficient. Similarly, it is necessary to introduce the vertex 25 into the mesh and therefore add the wavelet coefficient that is associated with it.

FIG. 2c shows the new subdivision of the face 21 at the instant t+1, after the geometrical modifications induced by the elimination (and addition respectively) of the wavelet coefficient associated with the vertex 24 (and 25 respectively) have been taken into account.

Once all the eliminations of hat coefficients during the step referenced 11 have been taken into account, the geometrical modifications are taken into account, leading to the field g of the vertices of the mesh. This taking into account of the geometrical modifications is done during the step referenced 12, according to the following algorithm:

```
procedure Evaluation ( )
    queue := level 0 faces
        while nonempty(queue) do
            currentFace := firstFace (queue)
            currentLevel := currentFace.level
            if subdivided(currentFace) do
                for each cornerVertex v of currentFace do
                    v.g+=v.hGeom[currentLevel]
                    v.hGeom[currentLevel] := 0
                end for
                for each edge Vertex e of currentFace do
                    if e has two parent faces then
                        e.g += (e.parentV[1].g + e.parentV[2].g)/4
                    else
                        e.g += (e.parentV[1].g + e.parentV[2].g)/2
                    end if
                end for
                for each child f of currentFace do
                    add f to queue
            else
                AddAListeDisplay(currentFace)
            end if
            for each vertex v of fGeom non-zero do
                v.fGeom += v.g
            v.g := 0
            end for
        end while
end.
```

Figure 4:
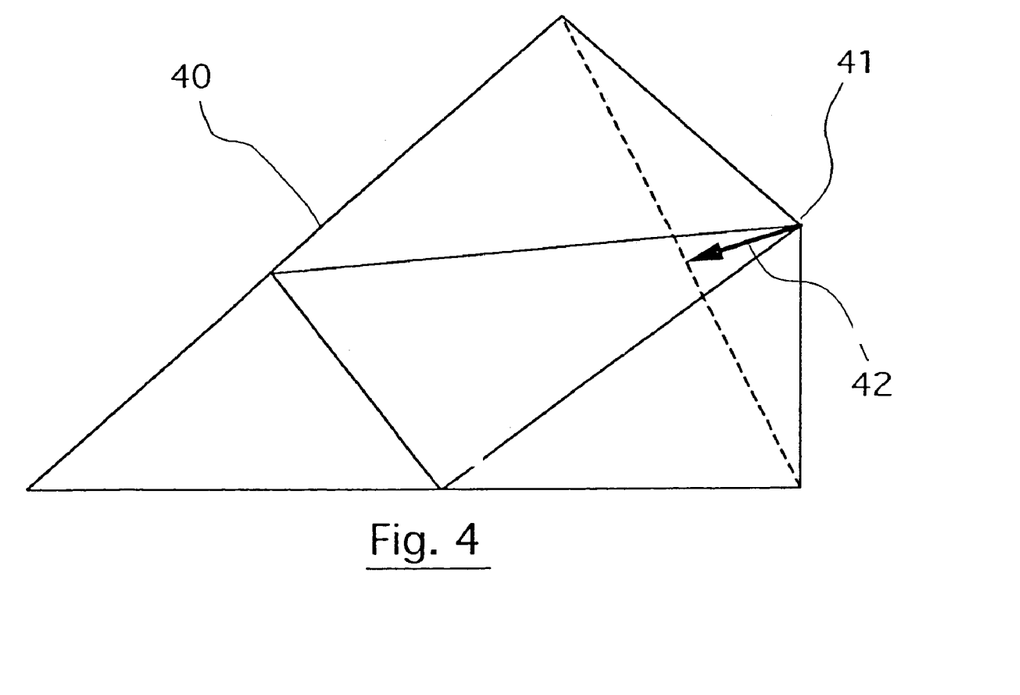
FIG. 4 illustrates the steps of the flattening of the mesh resulting from the elimination of a wavelet coefficient shown in FIG. 1.

FIG. 4 illustrates an operation of this kind for taking account of the geometrical modifications induced on the mesh. The mesh 40 is considered. In the step referenced 11, the wavelet coefficient indexed by the vertex 41 was eliminated. The taking of this elimination into account is expressed by a flattening 42 of the mesh 40.

During the step referenced 13 of FIG. 1, the pruning of the tree which hierarchically represents the reconstructed temporal mesh is carried out. The efficiency of the algorithms described here above, implemented during this pruning step 13, lies in the introduction of the following data structures:

the table 31 of VPC integers, illustrated in FIG. 3, such that if i is the index of a wavelet coefficient, VPC[i] is the vertex indexing this coefficient;

a stack of integers Gap such that if an integer i is in the stack Gap, the display list, in the position i, contains a non-displayed facet.

Figure 5:
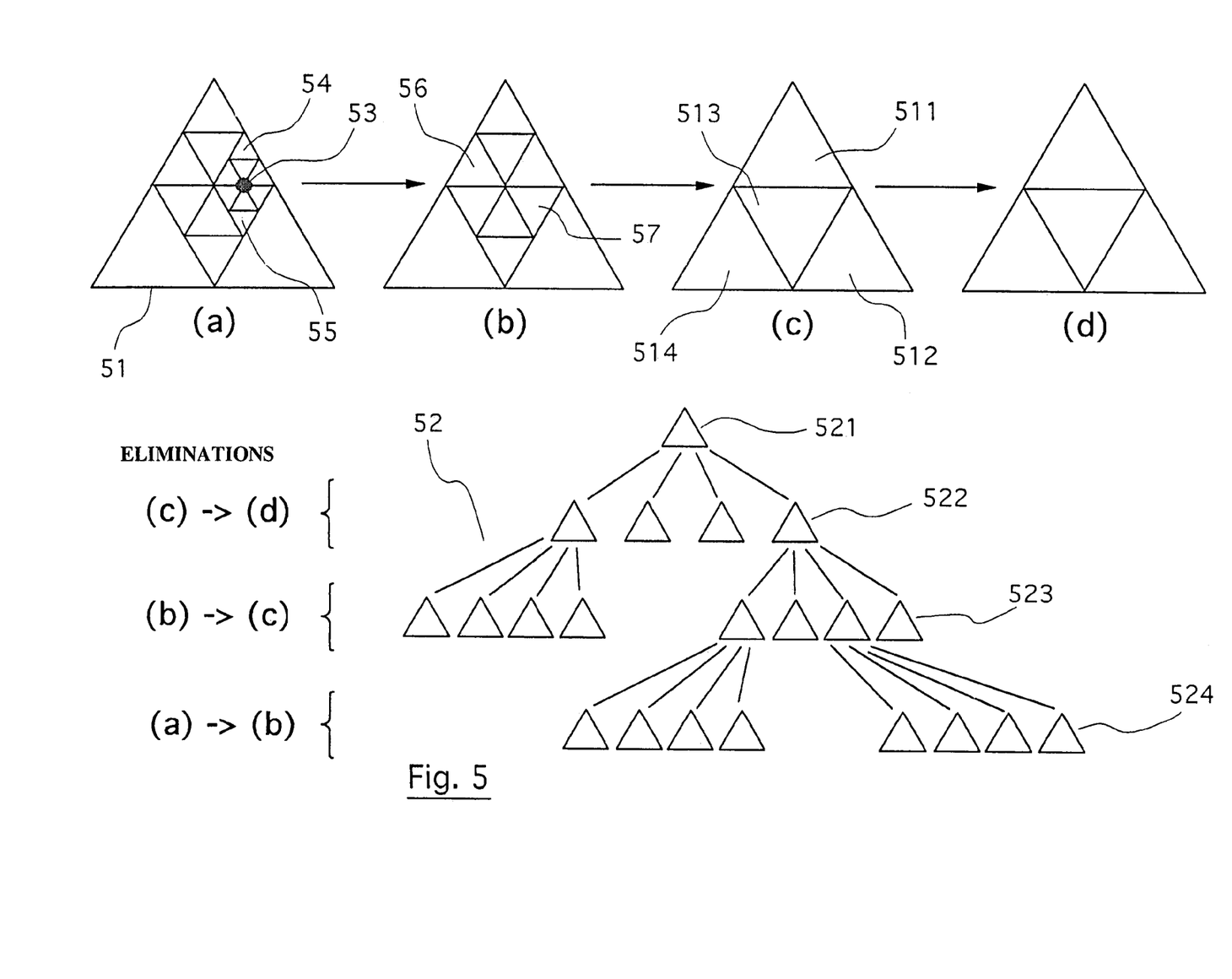
FIG. 5 shows the step of pruning the tree representing the hierarchical mesh, shown in FIG. 1.

A step 13 of this kind for pruning the tree is described in detail in FIG. 5. A face 51 of the mesh considered is associated with the hierarchical tree 52. The vertex 53 shown in FIG. 5a indexes the wavelet coefficient that is to be eliminated.

The operation passes from FIG. 5a to FIG. 5b in eliminating the wavelet coefficient associated with the vertex 53, and therefore the corresponding subdivisions of the facets 54 and 55. Such facets 54 and 55 are contiguous, and the vertex 53 constitutes the middle of their common edge. The passage from FIG. 5a to FIG. 5b corresponds to the elimination of the level 524 of the hierarchical tree 52.

The operation then passes from FIG. 5b to FIG. 5c in eliminating the subdivisions of the contiguous facets 56 and 57 of the face 51, i.e. in eliminating the nodes corresponding to the level 523 of the hierarchical tree 52.

The level 521 of the tree 52 corresponds to the face referenced 51 of the mesh. The four children of the node 521, located on the level 522 of the hierarchical level correspond to the facets 511, 512, 513 and 514 forming the face 51.

The adaptive reconstruction of a wavelet-based 3D scene or object, using the methods and algorithms described here above, can be applied especially but not exclusively in the broadcasting of 3D scenes, by a server, through a telecommunications network. Such a telecommunications communications network may be a network with a non-guaranteed bit rate. Hereinafter, referring to FIGS. 6 and 7, we shall describe a particular exemplary embodiment of a broadcasting of 3D scenes through a telecommunications network.

Figure 6:
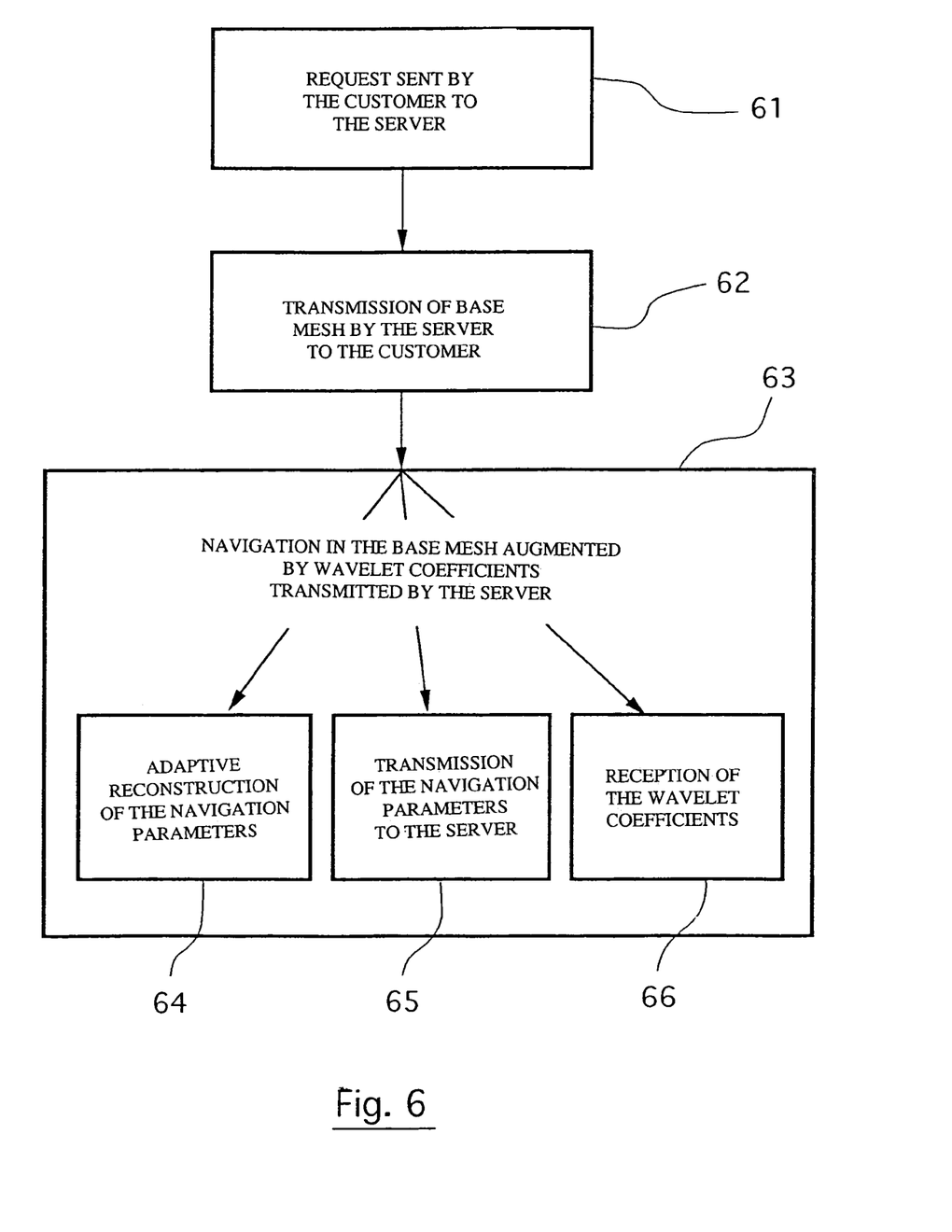
FIG. 6 illustrates the steps implemented during an exemplary application of the invention to the broadcasting of 3D scenes or objects through a telecommunications network.

In a step referenced 61, a customer sends out a request to a server by means of a telecommunications network, so as to be able to navigate progressively, interactively and adaptively within a 3D scene or object.

The server processes the customer's request 61 and, in reply, sends him (62) the base mesh associated with the required 3D scene or object. Such a step 62 is generally very fast since the base mesh or simple mesh $M_0$ has a limited number of facets. Conventionally, the number of facets of the mesh $M_0$ is smaller than 1000.

During a step referenced 63, the customer using a display terminal may navigate within the base mesh $M_0$ augmented by wavelet coefficients transmitted by the server. Thus, the navigation starts as soon as the reception of the scale coefficients is completed, and a displayed temporary model of the 3D scene is updated as and when the wavelet coefficients arrive.

During such a step 63, three independent processes may be implemented in parallel on the display terminal:

the adaptive reconstruction 64, as a function of the wavelet coefficients present in a cache memory of the display terminal, of the observer's position and his viewing parameters, namely his direction and his angle of view;

the regular transmission 65 to the server of the observer's position and his viewing parameters;

the reception of the wavelet coefficients necessary for the adaptive display of the 3D scene, coming from the server, and the consequent reorganisation of the cache memory of the display terminal.

Indeed, the wavelet coefficients are stored in a cache memory of the customer's terminal, and the temporary mesh is regularly updated through the use of the subset of stored wavelet coefficients, representing the visually relevant coefficients, which are identified from the parameters of navigation such as the observer's position and his direction of vision.

Each time that the virtual observer of the 3D object or scene scans a predetermined distance delta, a new partition is made of the set of wavelet coefficients present in the cache memory. Two lists are then prepared: one list of coefficients to be added to the temporary representation, and one list of coefficients to be eliminated from this representation.

The wavelet coefficients to be eliminated are processed one by one according to the method described here above and illustrated in FIG. 1:

the opposite of each of the wavelet coefficients to be eliminated is added during a step referenced 11;

the eliminations of the wavelet coefficients are taken into account geometrically in cascade during a step referenced 12, according to an adapted algorithm presented here above;

the tree of this representation of the mesh is pruned, during a step referenced 13, according to an adapted algorithm presented earlier in the document.

Control is then returned to the customer, who can view the mesh associated with the 3D scene, in shifting the virtual observer and modifying his direction and angle of view. The process is repeated as soon as the distance traveled by the virtual observer is equal to delta.

The implementation of the step referenced 63 of FIG. 6 necessitates the performance, on the server side, of a number of tasks equal to the number of customers who have sent out a demand 61, such tasks consisting in selecting, for each customer who has transmitted (65) his navigation parameters, the list of wavelet coefficients deemed to be visually relevant, and sending them (66) through the communications network.

Figure 7:
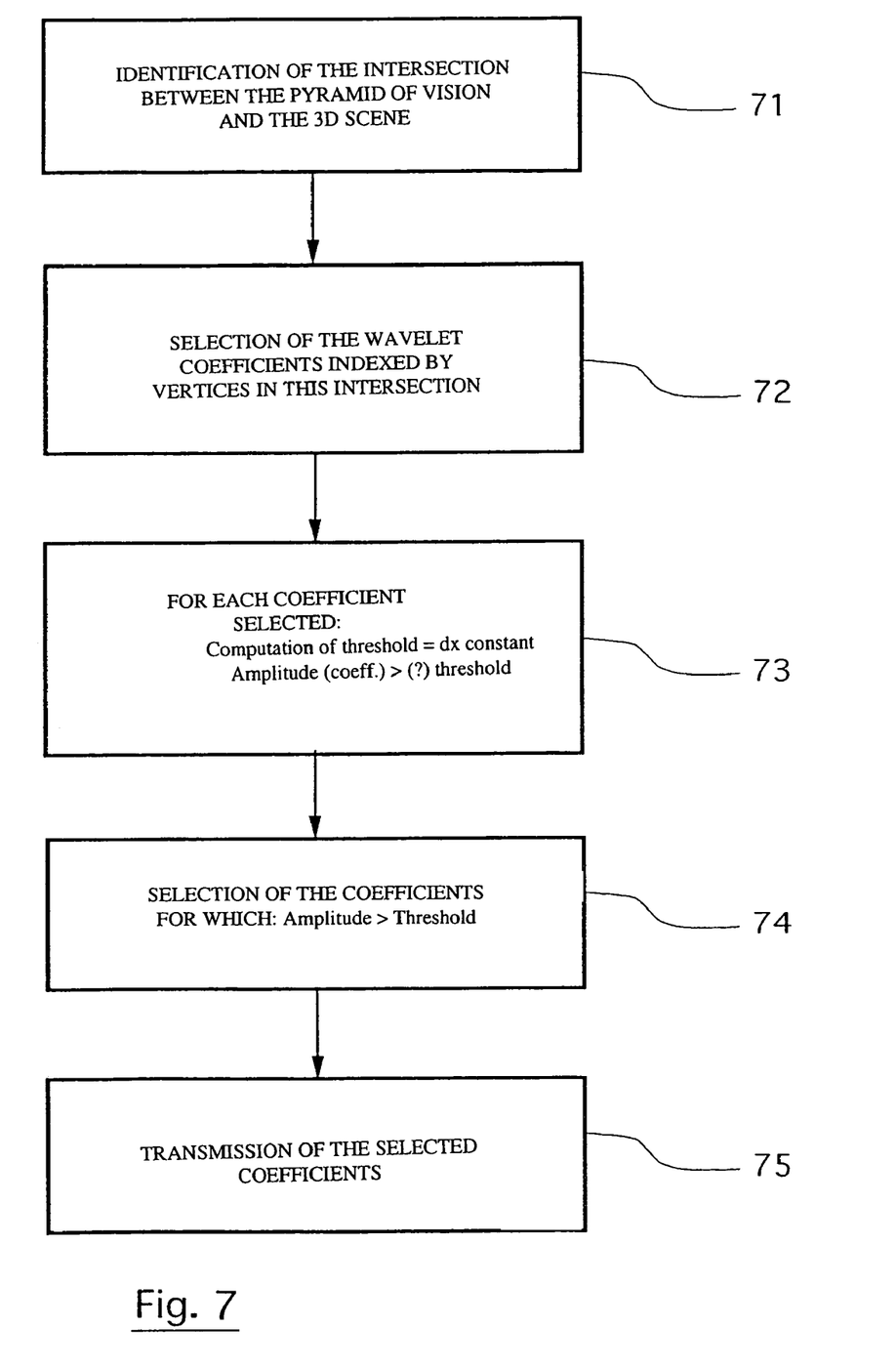
FIG. 7 shows the different operations performed by a server of the telecommunications network in the exemplary embodiment of FIG. 6.

The visual relevance of a wavelet coefficient is determined by a server according to the method illustrated in FIG. 7.

During a step referenced 71, the server identifies the intersection between the observer's pyramid of view (or a bigger pyramid known as the pyramid of anticipation) and the 3D scene that has been the object of the demand 61.

The server then selects (72) the wavelet coefficients indexed by vertices in the intersection identified.

During a step referenced 73, the server makes an evaluation, for each selected coefficient wavelet, of the product of multiplication of an indicator of capacity of the terminal by the distance from the observer to the vertex indexing the coefficient. This product constitutes a threshold, with which the server compares the amplitude of the wavelet coefficient.

An indicator of this kind may be a constant, fixed a priori, as a function of the processing capacity of the observer's display terminal. For example, such a constant is determined, prior to the start of the navigation, as a function of the type of processor available to the observer's display terminal.

An indicator of this kind may also vary during navigation, as a function of the current processing capacity of the display terminal. It is thus possible to envisage the implementation, at the beginning of the navigation, of a step for adapting the value of the indicator to the number of images per second that it should be possible to display on the terminal. The value of the indicator can then be updated, during the navigation, as a function of the resources of the terminal consumed by other applications or other processes which it deals with simultaneously, so as to maintain the initially fixed instruction on the number of images displayed per second (namely the "frame rate").

The information on the processing capacity of the display terminal is sent to the server by the display terminal.

At the end of the step referenced 73, the server keeps only (74) the wavelet coefficients whose amplitude is higher than the computed threshold, then sends them (75) to the customer by means of the communications network.

According to an alternative embodiment, prior to the transmission step 75, the server sends out a demand to the cache memory of the customers terminal in order to find out the wavelet coefficients that are already there, so as to avoid any unnecessary transfer of the coefficients. The customer's terminal then sends a one-column table of integers back to the server specifying, for each of the faces of the mesh, the number of wavelet coefficients associated with this face present in the cache memory of the terminal.

The wavelet coefficients may be sorted out efficiently by the server or by external sorting means implemented by another terminal with which the server co-operates through a rational organisation of a database assembling all the wavelet coefficients. For example, the sorting means (internal and/or external to the server) rely on an organisation based on a rising order of identification of the facets of the base mesh $M_0$, and, for each of these assets, on a sorting in amplitude of the wavelet coefficients indexed by vertices of the facets considered.

In this way, when the device in charge of the sorting of the coefficients has determined that a face F of the simple mesh $M_0$ is located in the observer's pyramid of vision (or in a wider pyramid known as the pyramid of anticipation), all it has to do is to scan the list of the wavelet coefficients of the face F, until it reaches a wavelet coefficient whose amplitude is lower than the threshold computed during the step referenced 73.

It is also possible to envisage an alternative embodiment according to which the customer, having sent the demand 61, himself determines the wavelet coefficients needed by him to view the 3D scene or object that is the object of his request. The customer can then send a second request to the server, asking for the dispatch, through the communications network, of the wavelet coefficients that he needs.

The invention claimed is:

1. A method for coding a source mesh representing a three-dimensional object or a scene, using a simple mesh having a limited number of facets, each defined by vertices and edges, and coefficients in a base of wavelets, corresponding to local modifications of said simple mesh, and making it possible, at each instant, to determine a function of parametrization of the source mesh, characterized in that it comprises:

a step to eliminate an effect of at least one wavelet coefficient verifying at least one criterion of non-essentiality if it is associated with a facet of said simple mesh not belonging to a visible part of said source mesh, so as to give a partial mesh, corresponding to a partial representation of said source mesh; and a step of flattening the source mesh by the addition, to said parametrization function, of an opposite of said wavelet coefficient or coefficients to be eliminated.

2. The coding method according to claim 1, characterized in that said partial mesh corresponds to a set of trees, each of said trees representing a face of said simple mesh and comprising a set of nodes each representing a face of a refined mesh of the face considered of said simple mesh.

3. The coding method according to claim 2, characterized in that it comprises a step of withdrawing at least one wavelet coefficient to be eliminated, comprising the following steps:

a taking into account of an opposite of said wavelet coefficient or coefficients;

a taking into account of the modifications induced by the previous step;

the elimination of the parts of the trees defining and influenced solely by said wavelet coefficient or coefficients.

4. The coding method according to claim 3, characterized in that said step of taking the modifications into account implements a recursive pruning algorithm.

5. The coding method according to claim 1, characterized in that it implements a set of pointers respectively pointing to all the vertices of said partial mesh, so as to directly reach a vertex indexing a wavelet coefficient to be eliminated.

6. The coding method according to claim 5, characterized in that said pointers are assembled in a table of integers.

7. A method for coding a source mesh representing a three-dimensional object or a scene,
using a simple mesh having a limited number of facets, each defined by vertices and edges, and coefficients in a base of wavelets, corresponding to local modifications of said simple mesh, and making it possible, at each instant, to determine a function of parametrization of the source mesh, characterized in that it comprises:
- a step to eliminate an effect of at least one wavelet coefficient verifying a criterion of non-essentiality if an amplitude of said wavelet coefficient is below a threshold, determined as a function of a distance between an observer and a vertex indexing said coefficient, so as to give a partial mesh, corresponding to a partial representation of said source mesh; and
- a step of flattening the source mesh by the addition, to said parametrization function, of an opposite of said wavelet coefficient or coefficients to be eliminated.

8. The coding method according to claim 7, characterized in that a wavelet coefficient verifies a criterion of non-essentiality if it is associated with a facet of said simple mesh not belonging to a visible part of said source mesh.

9. The coding method according to claim 7, characterized in that it comprises a step of computing said threshold, taking into account of said distance and of an indicator of capacity of a terminal for a display of said three-dimensional object or scene.

10. The coding method according to claim 9, characterized in that said capacity indicator is a constant depending on a processing capacity of said terminal.

11. The coding method according to claim 9, characterized in that said indicator of capacity varies during the display of said three-dimensional object or scene, as a function of a current processing capacity of said terminal.

12. An application of the coding method according to claim 1 to at least one member of the group comprising:
- displaying three-dimensional meshed objects on a screen;
- progressively displaying three-dimensional meshed objects on a screen, said wavelet coefficients being taken into account as and when they arrive;
- displaying three-dimensional meshed objects on a screen with at least two levels of detail corresponding to one of the successive meshes;
- displaying three-dimensional meshed objects on a screen with at least two levels of detail corresponding to a partial reconstruction of said source mesh with a limited number of wavelet coefficients;
- progressively transmitting, by a communications network, three-dimensional meshed objects;
- adaptively transmitting, by a communications network, of three-dimensional meshed objects; and
- adaptively updating three-dimensional objects through a communications network from a remote server.

* * * * *